(12) United States Patent
Loodberg (10) Patent No.: US 11,047,105 B2
(45) Date of Patent: Jun. 29, 2021

(54) CONTROL UNIT FOR DETERMINING THE POSITION OF AN IMPLEMENT IN A WORK MACHINE

(71) Applicant: CPAC SYSTEMS AB, Gothenburg (SE)

(72) Inventor: Pål Loodberg, Onsala (SE)

(73) Assignee: CPAC Systems AB, Gothenburg (SE)

(*) Notice: Subject to any disclaimer, the term of this patent is extended or adjusted under 35 U.S.C. 154(b) by 502 days.

(21) Appl. No.: 15/765,750

(22) PCT Filed: Oct. 6, 2015

(86) PCT No.: PCT/SE2015/051052
§ 371 (c)(1),
(2) Date: Apr. 4, 2018

(87) PCT Pub. No.: WO2017/061910
PCT Pub. Date: Apr. 13, 2017

(65) Prior Publication Data
US 2018/0291586 A1    Oct. 11, 2018

(51) Int. Cl.
*E02F 3/43* (2006.01)
*E02F 9/26* (2006.01)
(Continued)

(52) U.S. Cl.
CPC .............. *E02F 3/143* (2013.01); *E02F 3/435* (2013.01); *E02F 3/847* (2013.01); *E02F 9/20* (2013.01);
(Continued)

(58) Field of Classification Search
USPC .......................................................... 701/50
See application file for complete search history.

(56) References Cited

U.S. PATENT DOCUMENTS 5,461,803 A * 10/1995 Rocke .................... E02F 3/437
    37/443
8,768,583 B2 * 7/2014 Hargrave, Jr. .......... E02F 9/262
    701/50
(Continued)

FOREIGN PATENT DOCUMENTS

CN    104302848 A    1/2015
DE    112013005509 T5    1/2016
(Continued)

OTHER PUBLICATIONS

European Official Action (dated Apr. 15, 2019) for corresponding European App. 15905920.3.
(Continued)

*Primary Examiner* — Aniss Chad
*Assistant Examiner* — Mahmoud M Kazimi
(74) *Attorney, Agent, or Firm* — Sage Patent Group (57) ABSTRACT

A control unit is provided for a work machine. The work machine includes an implement and an arrangement for determining the position and orientation of the implement.
(Continued)

The control unit is adapted to, for at least two different orientations of the implement, perform the steps of:
determining that the implement contacts a reference surface,
determining the position of a reference point for the implement when the implement and the reference surface are in contact with each other, and
determining the position of a point on the periphery of the implement relative to said reference point by using said reference point position.

8 Claims, 6 Drawing Sheets

(51) Int. Cl.
    *G01B 21/22*      (2006.01)
    *E02F 3/84*      (2006.01)
    *G01B 21/02*      (2006.01)
    *E02F 3/32*      (2006.01)
    *E02F 3/14*      (2006.01)
    *E02F 9/20*      (2006.01)

(52) U.S. Cl.
    CPC ................ *E02F 9/26* (2013.01); *E02F 9/264* (2013.01); *G01B 21/02* (2013.01); *G01B 21/22* (2013.01); *E02F 3/32* (2013.01)

(56) References Cited

U.S. PATENT DOCUMENTS

| | | | |
|---|---|---|---|
| 2011/0169949 A1* | 7/2011 | McCain | G01B 11/022 348/137 |
| 2013/0261903 A1* | 10/2013 | Hargrave, Jr. | E02F 9/2033 701/50 |
| 2016/0002882 A1* | 1/2016 | Kanari | E02F 9/2033 701/50 |

FOREIGN PATENT DOCUMENTS

| | | |
|---|---|---|
| JP | 2012233353 A | 11/2012 |
| SE | 9701339 L | 5/1998 |
| WO | 92102853 A1 | 3/1991 |
| WO | 2015037642 A1 | 3/2015 |
| WO | 2015140406 A1 | 9/2015 |

OTHER PUBLICATIONS

International Search Report (dated Jul. 13, 2016) for corresponding International App. PCT/SE2015/051052.
Chinese First Office Action dated Mar. 20, 2020 for Chinese Patent Application No. 201580083468.4, 16 pages including English translation.

* cited by examiner

CONTROL UNIT FOR DETERMINING THE POSITION OF AN IMPLEMENT IN A WORK MACHINE

BACKGROUND AND SUMMARY

The present disclosure relates to a control unit for a work machine. Moreover, the present disclosure relates to a work machine control system and/or a work machine. Further, the present disclosure relates to a method for determining the shape of at least a portion of an implement.

The invention is applicable on working machines within the fields of industrial construction machines or construction equipment, in particular excavators. Although the invention will be described with respect to an excavator, the present disclosure is not restricted to this particular machine, but may also be used in other working machines such as wheel loaders and backhoe loaders.

Many types of work machines, such as an excavator, utilize an implement for performing assorted tasks, such as digging, with a load receiving portion of the implement. However, it is also quite common that an operator of a work machine uses the implement for performing tasks that involve other portions of the implement. For instance, an operator may use an implement portion that is not adapted to be load receiving. As an example, an operator may use a back side, such as a convex back side, of an implement for performing various auxiliary operations, such a ground compacting.

In order to ensure appropriate execution of such an auxiliary operation, it may be advantageous to be in possession of information as regards the shape of the implement portion intended to be employed for the auxiliary operation. However, the manufacturer of the implement may be distinct from the manufacturer of the work machine resulting in that it may not be straightforward to communicate data relating to the shape of the implement to the work machine. Moreover, the shape of a portion of the implement which is not load receiving may have a relatively complex shape, e.g. with varying radii of curvature or the like, which complex shape may be cumbersome to distribute to e.g. a control unit of a work machine, for instance since there is no generally accepted standard for communicating implement shape data between e.g. implement manufacturers and work machine operators.

It is desirable to provide a control unit for a work machine which control unit may determine a shape of at least a portion of an implement.

As such, the present disclosure relates to a control unit for a work machine. The work machine comprises an implement and an arrangement for determining the position and orientation of the implement.

Furthermore, the control unit is adapted to, for at least two different orientations of the implement, perform the steps of:
that the implement contacts a reference surface,
determining a position of a reference point for the implement when the implement and the reference surface are in contact with each other, and
determining the position of a point on the periphery of the implement relative to the reference point by using the reference point position.

By virtue of the above control unit, information can be obtained which enables the shape of at least a portion of an implement to be determined. In particular, the above information may be obtained from one or more devices that are already present in and/or on the work machine, such as means for determining the position of a reference point for the implement.

Thus, the above control unit implies a determination of a shape of at least a portion of an implement which does not necessarily require dedicated determination equipment. Furthermore, by virtue of the fact that the control unit may use information from devices and/or systems already present in the work machine, the control unit may utilize information that is provided by such devices which in turn implies that the control unit may determine a shape of at least a portion of an implement without requiring dedicated control sensor signals or the like. Instead, control sensor signals already provided by work machine devices may be used.

Optionally, the control unit may be adapted to determine that the implement has been moved until it contacts a reference surface.

Optionally, the reference surface has an extension with a reference surface normal, the feature of determining the position of a point on the periphery of the implement relative to the reference point comprising determining a relative distance, in at least a direction parallel to the reference surface normal, between the reference surface and the reference point.

Including the above relative normal distance between the reference surface and the reference point implies an increased possibility to appropriately determine the shape of a portion of the implement.

Optionally, the control unit is adapted to determine a position, in at least a direction parallel to the reference surface normal, of the reference surface.

Determining the position of the reference surface as outlined above implies a straightforward way of determining the relative distance between the reference point and the reference surface. For instance, the position of the reference surface may need to be determined only once during the execution of a shape determining procedure. The relative distance between the reference point for the implement and the reference surface may thereafter be determined by determining the position of the reference point and from that position subtracting the thus determined reference surface position.

Optionally, the control unit is adapted to determine a shape of at least a portion of the implement using at least the different orientations and the associated positions of a point on the periphery of the implement.

Optionally, the reference surface extends in a reference surface plane and the feature of determining a shape of at least a portion of the implement comprises:
for each one of the orientation of the implement relative to the work machine, generating an implement delimiting plane extending along the reference surface plane, and
superposing the implement delimiting planes thus generated in order to form an aggregate representation of the implement.

The above procedure implies that a shape of at least a portion of the implement may be determined even if the implement portion has a general, e.g. not necessarily circular or oval, convex shape.

Optionally, the control unit further is adapted to superpose the implement delimiting planes by, for a predetermined range of orientations of the implement relative to the work machine, selecting the implement delimiting plane that has the smallest distance to the reference point for the implement.

Optionally, the implement comprises an implement edge and the feature of determining the position of the reference surface comprises detecting that the implement edge contacts the reference surface.

Optionally, the control unit is adapted to use a surface of the ground onto which the work machine is located as the reference surface.

Optionally, the control unit is adapted to use a surface of the work machine as the reference surface.

Irrespective of which reference surface that is used, e.g. a surface of the ground or a surface of the work machine, the reference surface is preferably relatively planar and non-compressible.

Optionally, the control unit is adapted to use a point around which the implement is pivotable in relation to the work machine as the reference point for the implement. Purely by way of example, such a point may be located on an implement pivot axis, viz an axis around which the implement is adapted to pivot. As another non-limiting example, the point may be located in the intersection between two or three pivot axes that for instance are perpendicular to one another.

A second aspect of the present disclosure relates to a work machine control system comprising a control unit according to the first aspect of the present disclosure.

A third aspect of the present disclosure relates to a work machine comprising a work machine control system according to the second aspect of the present disclosure and/or a control unit according to the first aspect of the present disclosure.

A fourth aspect of the present disclosure relates to a method for determining the shape of at least a portion of an implement. The implement is connected to a work machine and the work machine comprises a position determining assembly adapted to determine the position and orientation of the implement.

The method according to the fourth aspect comprises:

moving the implement until it contacts the reference surface, determining a position of a reference point for the implement when the implement and the reference surface are in contact with each other, and determining the position of a point on the periphery of the implement relative to the reference point by using the reference point position.

Optionally, the reference surface has an extension with a reference surface normal. The feature of determining the position of a point on the periphery of the implement relative to the reference point by comprising determining a relative distance, in at least a direction parallel to the reference surface normal, between the reference surface and the reference point.

Optionally, the method further comprises determining a position, in at least a direction parallel to the reference surface normal, of the reference surface.

Optionally, the method further comprises determining the shape of at least a portion of the implement using at least the different orientations and the associated positions of a point on the periphery of the implement.

Optionally, the reference surface extends in a reference surface plane and the feature of determining a shape of at least a portion of the implement comprises:

for each one of the orientation of the implement relative to the work machine, generating an implement delimiting plane extending along the reference surface plane, and superposing the implement delimiting planes thus generated in order to form an aggregate representation of the implement.

Optionally, the method comprises superposing the implement delimiting planes by, for a predetermined range of orientations of the implement relative to the work machine, selecting the implement delimiting plane that has the smallest distance to the reference point for the implement.

Optionally, the implement comprises an implement edge and the feature of determining the position of the reference surface comprises detecting that the implement edge contacts the reference surface.

Optionally, the reference surface is a portion of the ground onto which the work machine is located.

Optionally, the reference surface is a portion of the work machine.

Optionally, the reference point for the implement is a point around which the implement pivots in relation to the work machine.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION

The invention will be described in the following for a work machine 10 in the form of an excavator such as the one illustrated in FIG. 1. The excavator 10 should be seen as an example of a work machine which could comprise a control unit and/or a work machine control system according to the present invention and/or for which a method according to the present invention could be carried out.

Figure 1:
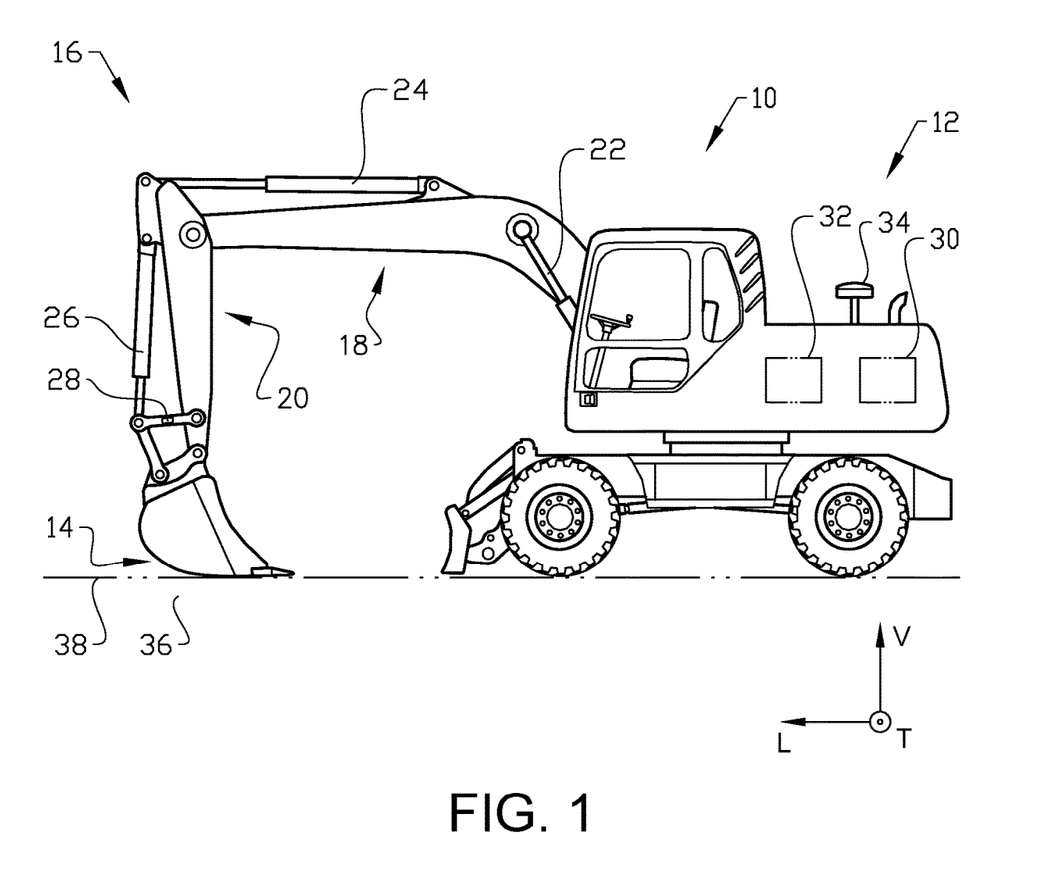
FIG. 1 illustrates a work machine comprising an embodiment of a control unit in accordance with the present invention.

The FIG. 1 work machine 10 comprises a main body 12, an implement 14 and a connector 16 connecting the implement 14 to the main body 12. In FIG. 1, the connector 16 comprises a boom 18 and a stick 20. It should be noted that other work machines may comprise a connector with more or fewer components. For instance, it is envisaged that certain work machines, such as a wheeled excavator, may comprise a first boom (not shown) pivotally connected to the main body, a second boom (not shown) pivotally connected to the first boom and a stick pivotally connected to the second boom.

The main body 12 has a vertical extension in a vertical direction V. Moreover, and as is indicated in FIG. 1, the main body 12 also has an extension in a longitudinal dimension L in the intended drive direction of the work machine 10 and an extension in a transversal dimension T being perpendicular to each one of the vertical and longitudinal dimensions V, L.

Purely by way of example, and as is illustrated in FIG. 1, the boom 18 may be pivotally connected to the main body 12 and may be actuated by a boom actuator 22 connected to each one of the main body 12 and the boom 18. In a similar vein, the stick 20 may be pivotally connected to the boom 18 and may be actuated by a stick actuator 24 connected to each one of the boom 18 and the stick 20. Purely by way of example, at least one, alternatively both, of the boom actuator 22 and the stick actuator 24 may comprise a hydraulic cylinder, such as a double acting hydraulic cylinder. Additionally, the implement 14 may be moveable relative to the stick 20 by means of an implement actuator 26, e.g. a hydraulic implement actuator 26. For instance, the implement 14 may be pivotable relative to the stick 20.

It is also envisaged that other implementations of the connector 16 may include further means for moving the implement 14 in relation to other components of the connector 16, such as the stick. Purely be way of example, implementations of the connector 16 may comprise means (not shown) such as one or more additional actuators (not shown) for tilting the implement 14 and/or pivoting the implement 14 around a pivot axis that extends substantially parallel to the longitudinal extension of the stick 20.

The FIG. 1 work machine 10 further comprises a control unit 30, such as an electronic control unit, which may be adapted to control work machine operations and/or to process data relevant for the operation of the work machine 10. As non-limiting and non-exhaustive examples, the feature "processing data" may include one or more of: determining, storing, transmitting or receiving data.

Purely by way of example, the control unit 30 may comprise a computer program comprising program code means for performing the computing steps of any one of the methods that will be presented hereinbelow. For instance, the control unit 30 may comprise a computer readable medium carrying a computer program comprising program code means for performing the computing steps of any one of the methods that will be presented hereinbelow.

Further, the work machine 10 comprises an arrangement 32 for determining the position and orientation of the implement 14. As a non-limiting example, such a position and orientation may be determined using information indicative of the current condition, e.g. stroke, of each one of the previously discussed actuators 22, 24, 26.

However, it is also envisaged that implementations of the arrangement 32 also and/or instead may determine the relative angles between the components, e.g. the main body 12, the boom 18, the stick 20 and the implement 14, of the work machine 10. Such an implementation of the position determining means 32 may comprise one or more angle gauges or sensors (exemplified by sensor 28 in FIG. 1) adapted to determine the relative angle between at least two components of the connector 16. As a further alternative, the arrangement 32 may instead, or in addition to any one of the above discussed implementations, comprise one or more inclinometer or a more advanced gauge of similar type.

Figure 2:
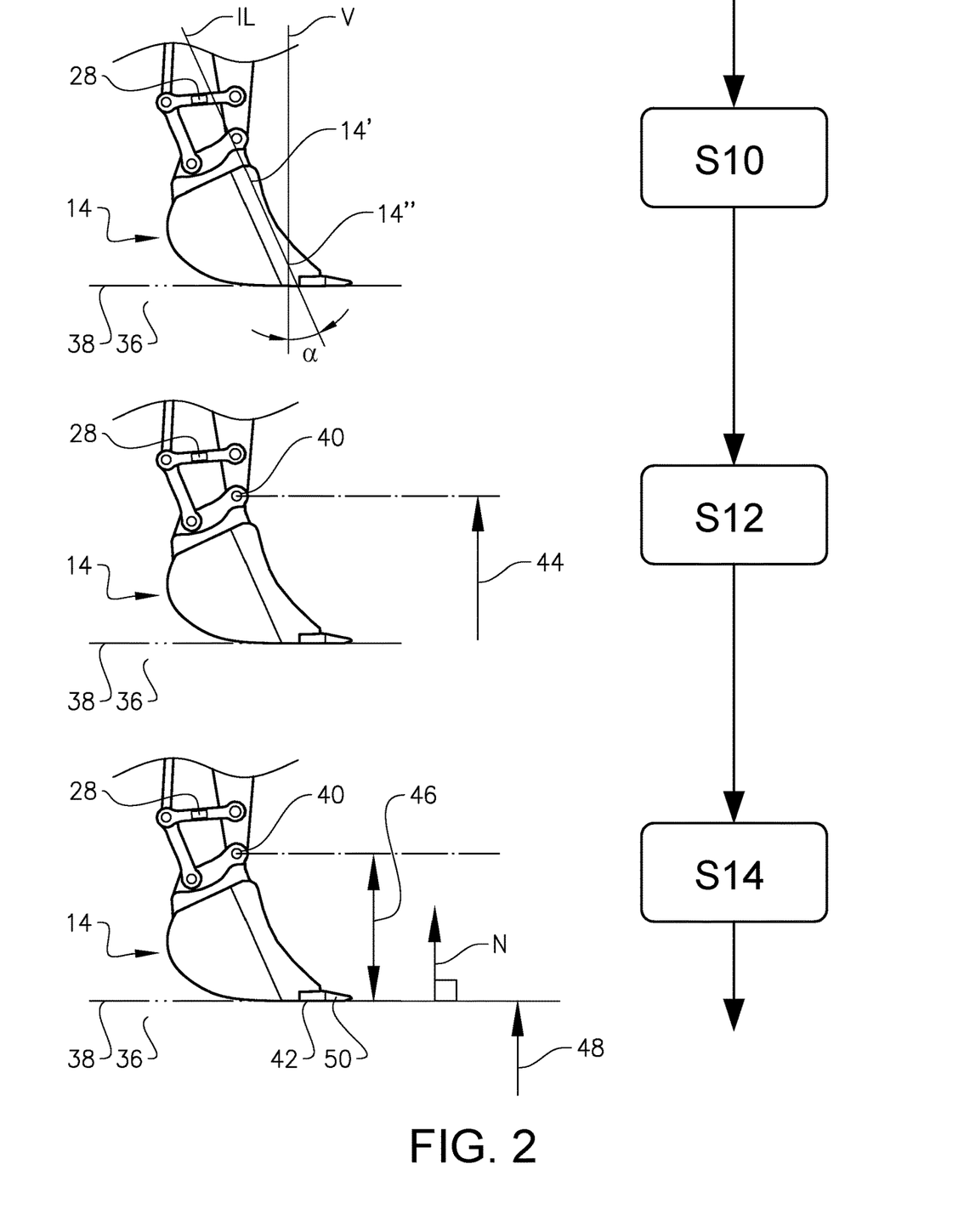
FIG. 2 schematically illustrates a procedure for determining the position of a point on the periphery of an implement.

Purely by way of example, an orientation of the implement 14 may relate to an angular position of the implement 14 relative to a reference angular position thereof. As a non-limiting example, parameters associated with each orientation, such as each angular position, may be determined by means of the above-discussed position determining means 32. In FIG. 2, the orientation corresponds to an angular position of the implement 14 relative to a reference line, such as a vertical line, viz a line extending in the vertical direction V. As a non-limiting example, the angular position α of the implement may be determined by determining the angle α between a reference line, such as the vertical line V, and an implement line IL that extends through at least two predetermined portions 14', 14" of the implement 14.

Although the orientation illustrated in FIG. 2 relates to a rotation around an axis extending in a direction substantially parallel to the transversal dimension T, it is also envisaged that the orientation instead or in addition may refer to a rotation around an axis substantially parallel to any one of the vertical and longitudinal dimensions V, L. Purely by way of example, for an implement that has a varying shape along both of the longitudinal and transversal dimensions L,T, the orientation may relate to varying angular positions around both the longitudinal and transversal dimensions L,T.

As such, the expression "orientation" may relate to a pivot or a rotation of the implement 14 around one, two or three pivot axes that are perpendicular to one another. Preferably, the pivot axes intersect at a pivot point and the orientation of the implement 14 may relate to the pivot of the implement 14 relative to the pivot point around one or more pivot axes. Purely by way of example, the orientation may relate to various pivot positions around one pivot axis only or a first set of various pivot positions around a first pivot axis and a second set of various pivot positions around a second pivot axis. As another non-limiting example, the orientation may relate to pivot positions around two or more pivot axes at the same time, viz a combined pivot of the implement 14.

Furthermore, with reference to FIG. 2, the control unit 30 is adapted to, for at least two different orientations of the implement 14, in a step S10 determine that the implement 14 has been moved until it contacts a reference surface 38. The number of different orientations preferred may be varied depending on the shape of the implement. Purely by way of example, a general implement shape complexity may be determined prior to executing the steps illustrated in FIG. 2. As another non-limiting example, a current implement shape convexity may be determined based on the information obtained from the steps in FIG. 2. For instance, if it is concluded that the information obtained from the FIG. 2 steps indicates that the implement, at a current orientation, appears to have a relatively complex shape, viz a shape with a relatively large shape change such as a corner, subsequent orientations of the implement may be achieved in relatively small orientation change increments.

Purely by way of example, the above step S10 may comprise determining a contact force between the reference surface and the implement and determining that the implement 14 contacts the reference surface 38 when the contact force exceeds a predetermined threshold force. As another non-limiting example, the feature of determining that the implement 14 contacts the reference surface 38 may comprise the use of visual means, such as a camera or another type of sensor.

In the implementation illustrated in FIG. 2, the reference surface 38 is a surface of the ground 36 onto which the work machine 10 is located. However, as will be elaborated on hereinbelow, other types of reference surfaces are also envisaged. Preferably, the reference surface is at least relatively planar and non-compressible.

Moreover, as further is indicated in FIG. 2, the control unit 30 is in a step S12 adapted to determine the position 44 of a reference point 40 for the implement 14 when the implement 14 and the reference surface 38 are in contact with each other. In the FIG. 2 implementation, the reference point 40 is a point around which the implement 14 pivots in relation to the work machine (not shown in FIG. 2). However, it is also envisaged that the control unit 30 may use a reference point 40 in another position. Purely by way of example, the reference point 40 may be located in another position of the implement 14, such as an implement edge 50, or even in or on another component of the work machine (not shown in FIG. 2). The position 44 of the reference point 40 may be determined by means of the previously discussed arrangement 32.

FIG. 2 further illustrates that the control unit 30 is in a step S14 adapted to determine the position of a point 42 on the periphery of the implement 14 relative to the reference point 40 by using the reference point position 44.

Purely by way of example, as is illustrated in FIG. 2, the reference surface 38 may have an extension with a reference surface normal N. In the FIG. 2 example, the reference surface normal N extends in a direction parallel to the vertical direction V. However, in other embodiments, the reference surface normal N may extend in a direction that forms an angle with the vertical direction V.

Moreover, the feature of determining the position of a point 42 on the periphery of the implement 14 relative to the reference point 40 may comprise determining a relative distance 46, in at least a direction parallel to the reference surface normal N, between the reference surface 38 and the reference point 40.

As a non-limiting example, the relative distance 46 may be measured directly, e.g. by using a measuring means such as a measure rule, a measure tape or the like. It is also envisaged that the relative distance 46 may be measured by an electronic distance determining means, for instance an optical distance determining means that can determine the distance between the reference point and the reference surface 38.

As further alternative, the control unit 30 may be adapted to determine a position 48, in at least a direction parallel to the reference surface normal N, of the reference surface 38. Purely by way of example, if the implement comprises an implement edge 50, as is illustrated in FIG. 2, such a position 48 may be determined by a procedure that comprises detecting that the implement edge 50 contacts the reference surface 38.

The control unit 30 may be adapted to determine a shape, such as an outer shape, of at least a portion of the implement 14 relative to the reference point 40 for the implement using at least the different orientations and the associated positions of a point on the periphery of the implement 14. Such a determination may be carried out simultaneously with the features S10-S14 that have been presented hereinabove. Alternative, the determination may be performed after the steps S10-S14 have been performed for one or more orientation of the implement 14.

For specific shapes of the periphery of portions of an implement 14, such as circular shapes, the location of a point of the implement 14 relative to the reference point 40 for the implement may be determined directly using a certain orientation and the determined associated position of a point 42 on the periphery of the implement 14.

However, for a more complex shape of an implement 14, the control unit 30 may be adapted to employ features that can account for a more general shape of the implement. Examples of such features are presented hereinbelow with reference to FIGS. 3A-3E.

The FIG. 3 procedure utilizes a prerequisite that the reference surface 38 extends in a reference surface plane. As may be gleaned from each one of FIGS. 3A-3D, the example features comprises, for each one of the orientations of the implement 14 relative to the work machine, generating an implement delimiting plane 52, 54, 56, 58 extending along, i.e. parallel to and on the same level as, the reference surface plane. As such, in each one of FIG. 3A-FIG. 3D, for each orientation of the implement 14, an implement delimiting plane is located at the associated relative distance 46 from the reference point 40, in a direction parallel to the reference surface normal N.

Figure 3A:
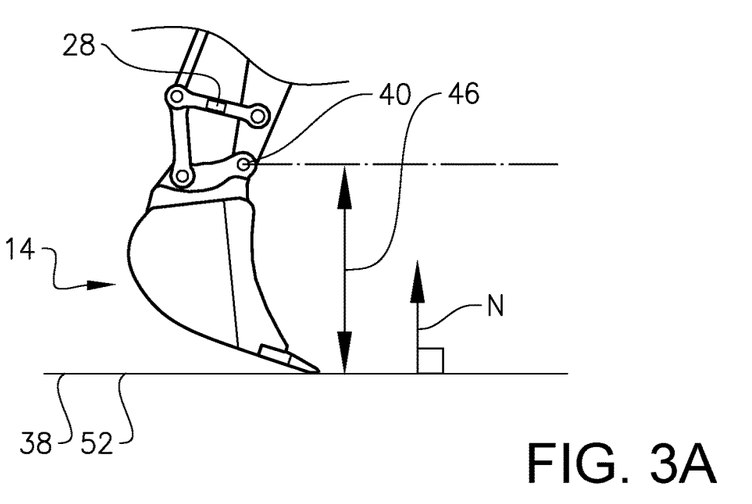
FIG. 3 schematically illustrates a procedure for determining a shape of at least a portion of an implement relative to a reference point for the implement.
Figure 3B:
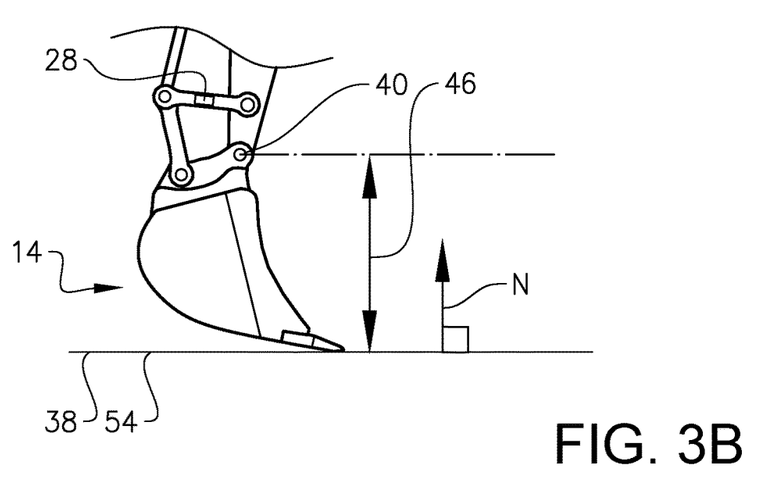
Figure 3C:
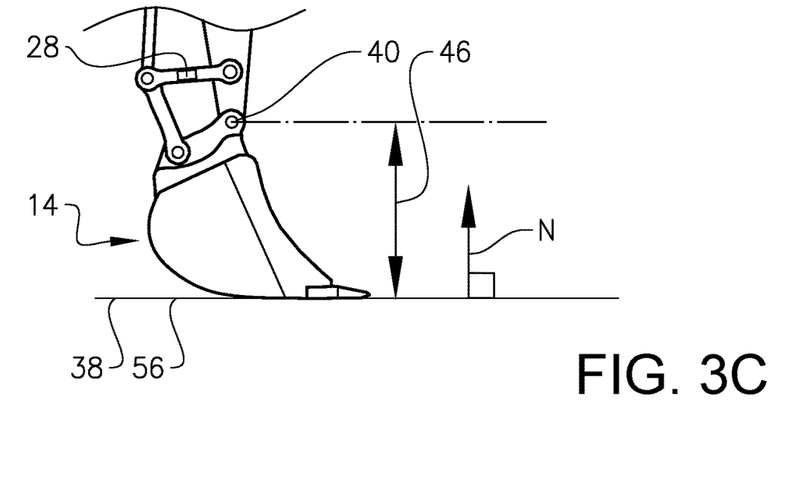
Figure 3D:
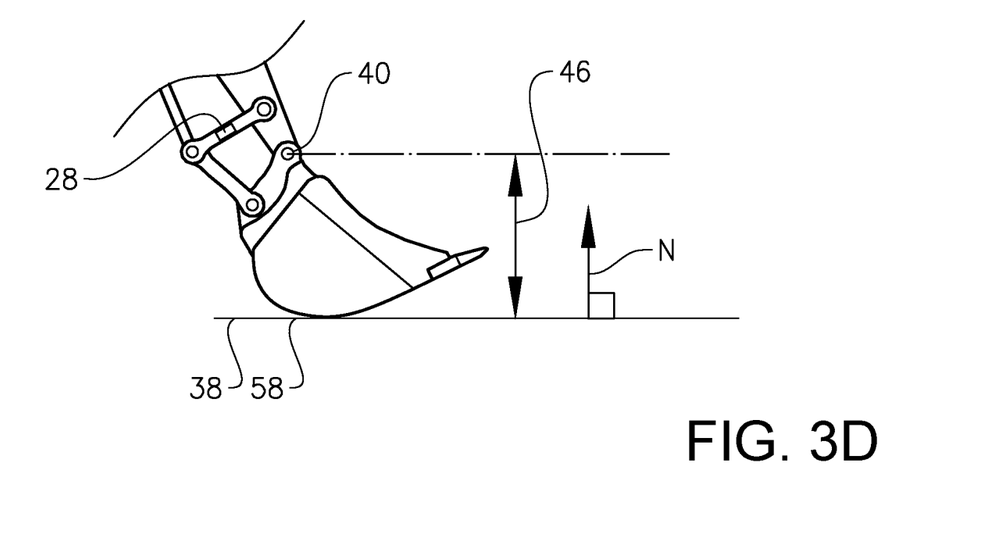
Figure 3E:
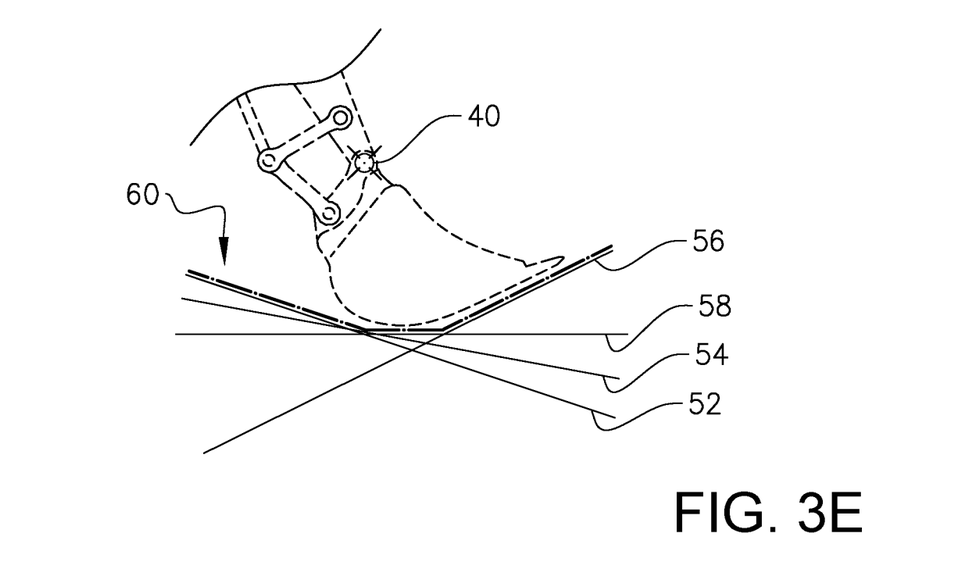

As may be gleaned from FIG. 3A-FIG. 3D, the corresponding implement delimiting plane 52, 54, 56, 58 extends in a plane direction that forms an angle with the implement 14, which angle is dependent on the current orientation of the implement 14. In 3A-FIG. 3D, the reference surface 38 is fixed but the orientation of the implement 14 varies. If the implement orientations illustrated in FIG. 3A-FIG. 3D instead are regarded from an implement 14 point of view, the orientation of the implement delimiting planes 52, 54, 56, 58 in relation to the implement 14 varies. FIG. 3E illustrates all the implement delimiting planes 52, 54, 56, 58.

Then, as is illustrated in FIG. 3E, a model of the periphery of the implement 14 is generated, e.g. the location of at least two points of the implement 14 is determined, by superposing the implement delimiting planes 52, 54, 56, 58 thus generated in order to form an aggregate representation 60 of the implement 14. In other words, a shape of at least a portion of the implement 14 is determined.

The procedure of superposing the implement delimiting planes 52, 54, 56, 58 may be achieved in a plurality of ways. In the example illustrated in FIG. 3E, the control unit 30 is adapted to superpose the implement delimiting planes 52, 54, 56, 58 by selecting an implement delimiting plane 52, 54, 56, 58 having a smallest distance to the reference point 40 for the implement. Such a selection may be performed for a predetermined range of orientations of the implement relative to the work machine.

In other words, and as is indicated in FIG. 3E, the aggregate representation 60 is generated by forming a surface that is tangent to innermost implement delimiting planes 52, 54, 56, 58, viz the implement delimiting plane 52, 54, 56, 58 that has a surface that faces the reference point 40.

Purely by way of example, the aggregate representation 60 may be generated by fitting a polynomial, e.g. a polynomial the order of which is equal to or greater than two, to the implement delimiting planes 52, 54, 56, 58. Such a polynomial fitting may be beneficial if the shape of at least a portion of the implement 14 is relatively smooth.

In the example procedure in FIG. 3A-3E, the implement delimiting planes 52, 54, 56, 58 may firstly be determined and the aggregate representation 60 may thereafter be formed. However, it is also envisaged that implementations of a procedure for forming an aggregate representation 60 of the implement 14 comprises a step of superposing only one or more implement delimiting plane 52, 54, 56, 58 at a time. For instance, in an implementation of the above procedure, a portion of the aggregate representation 60 may be generated after each generation of an implement delimiting plane 52, 54, 56, 58.

Figure 4:
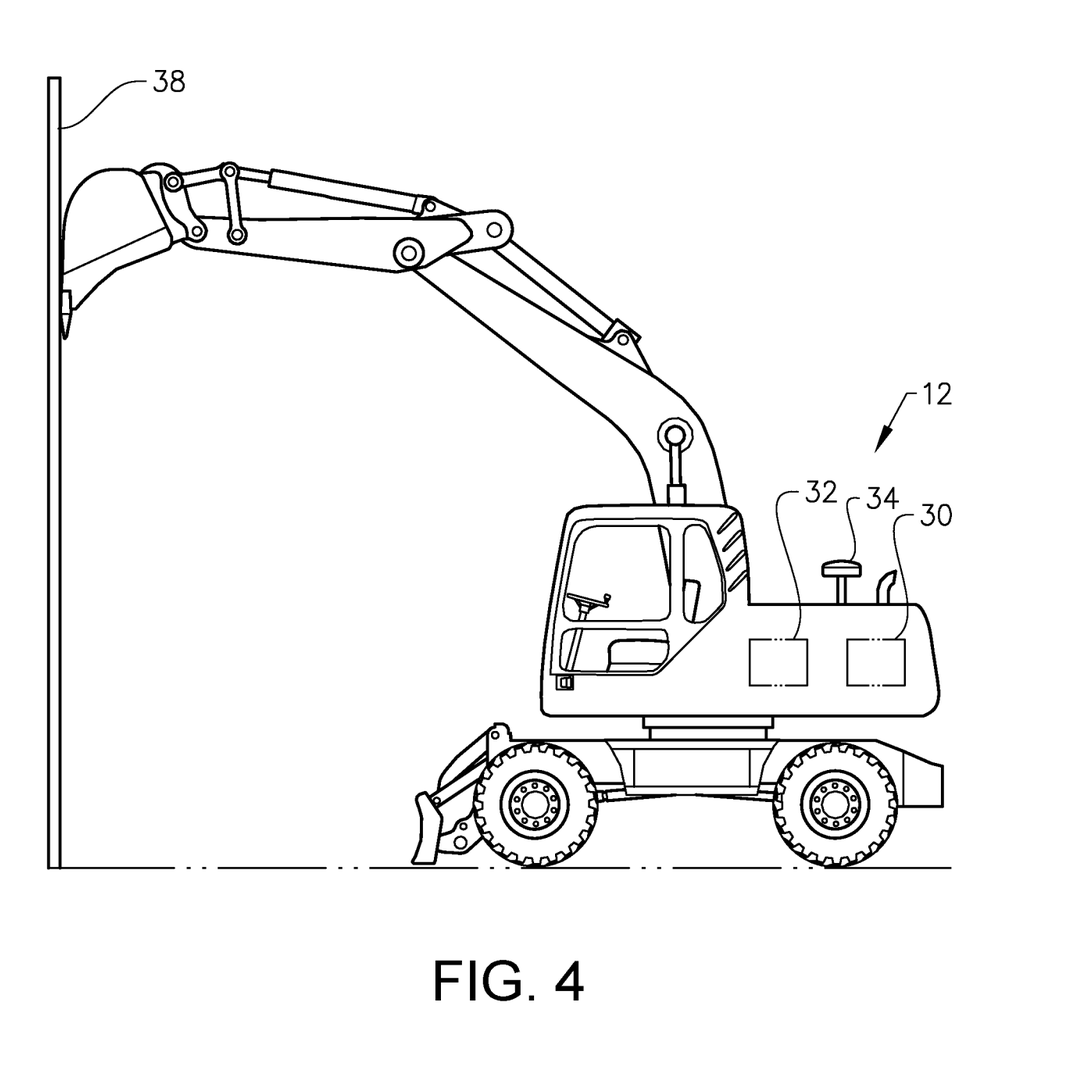
FIG. 4 illustrates a work machine and an alternative reference surface.
Figure 5:
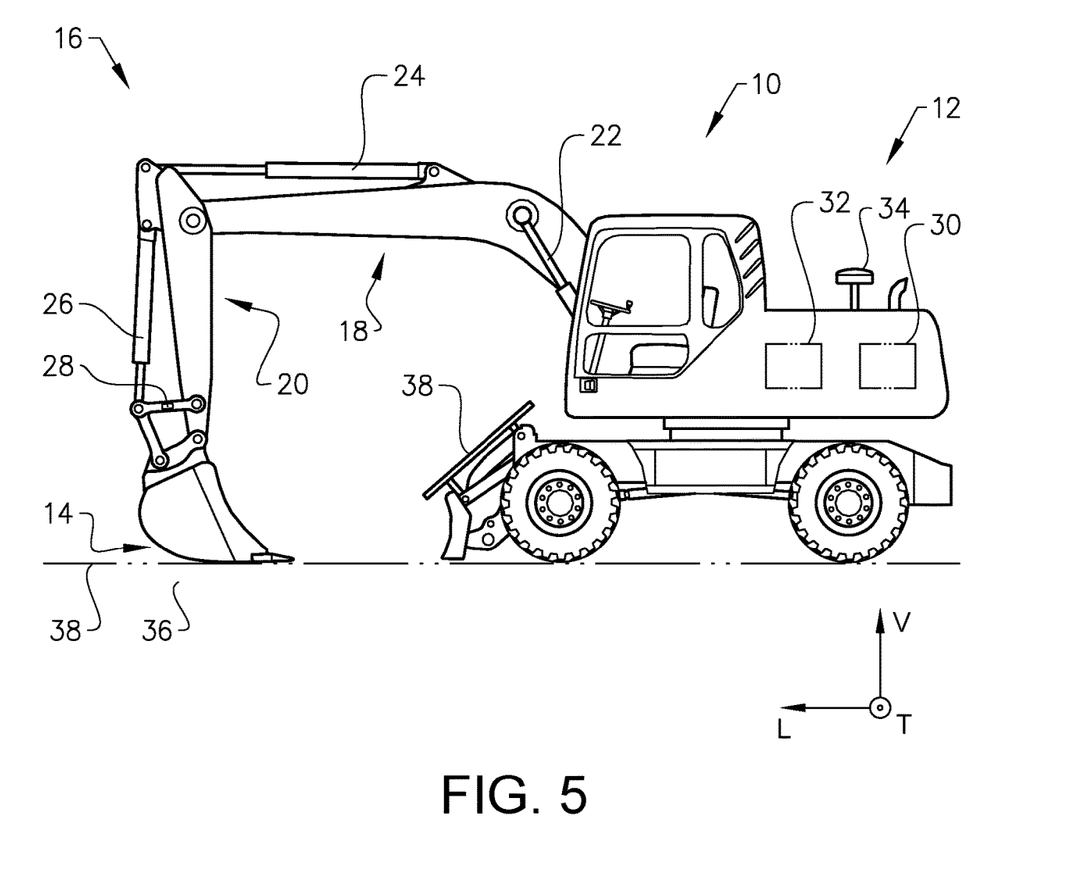
FIG. 5 illustrates a work machine and another reference surface.

As has been intimated hereinabove, the reference surface 38 may be a surface of the ground 36 onto which the work machine 10 is located. However, it is also envisaged that other locations and/or orientations of the reference surface 38 may be employed. To this end, reference is made to e.g. FIG. 4 in which a vertically extending reference surface 38 is used. Moreover, the reference surface 38 need not necessarily be separate from the work machine 10. To this end, reference is made to FIG. 5 illustrating a reference surface 38 that is a surface of the work machine 10.

It is to be understood that the present invention is not limited to the embodiments described above and illustrated in the drawings; rather, the skilled person will recognize that many changes and modifications may be made within the scope of the appended claims. For instance, although the present invention has been presented hereinabove with reference to a control unit 30 that is adapted to perform various steps, it should be noted that the above description is also intended to support a method according to the present invention that performs the same or similar steps.

The invention claimed is:

1. A method for determining the shape of at least a portion of an implement using at least different orientations and the associated positions of a point on the periphery of the implement, the implement being connected to a work machine, the work machine comprising a position determining assembly adapted to determine the position and orientation of the implement, the method comprising:
    moving the implement until it contacts a reference surface,
    determining the position of a reference point for the implement when the implement and the reference surface are in contact with each other, the reference surface extending in a reference surface plane,
    determining the position of a point on the periphery of the implement relative to the reference point by using the reference point position,
    for each one of the orientation of the implement relative to the work machine, generating an implement delimiting plane located at a relative distance from the reference point and extending along the reference surface plane, and
    superposing the implement delimiting planes thus generated in order to form an aggregate representation of the implement.

2. The method according to claim 1, wherein the reference surface has an extension with a reference surface normal, the feature of determining the position of a point on the periphery of the implement relative to the reference point comprising determining a relative distance, in at least a direction parallel to the reference surface normal, between the reference surface and the reference point.

3. The method according to claim 2, further comprising determining a position, in at least a direction parallel to the reference surface normal, of the reference surface.

4. The method according to claim 3, wherein the implement comprises an implement edge and the feature of determining the position of the reference surface comprises detecting that the implement edge contacts the reference surface.

5. The method according to claim 1, wherein the method comprises superposing the implement delimiting planes by, for a predetermined range of orientations of the implement relative to the work machine, selecting the implement delimiting plane that has the smallest distance to the reference point for the implement.

6. The method according to claim 1, wherein the reference surface is a portion of the ground onto which the work machine is located.

7. The method according to claim 1, wherein the reference surface is a portion of the work machine.

8. The method according to claim 1, wherein the reference point for the implement is a point around which the implement is pivotable in relation to the work machine.

* * * * *